United States Patent [19]

Schafft

[11] Patent Number: 4,647,415

[45] Date of Patent: Mar. 3, 1987

[54] METHOD OF PRODUCING A FILTER PAD

[76] Inventor: Helmut Schafft, Kellerstrasse 23, D-7074 Mogglingen, Fed. Rep. of Germany

[21] Appl. No.: 696,454

[22] Filed: Jan. 31, 1985

[30] Foreign Application Priority Data

Feb. 3, 1984 [DE] Fed. Rep. of Germany ....... 3403738

[51] Int. Cl.$^4$ .............................................. B28B 1/26
[52] U.S. Cl. ..................................... 264/86; 264/113; 264/DIG. 48
[58] Field of Search ................... 264/86, 87, 112, 113, 264/DIG. 48, 257, 255, 49; 55/DIG. 5

[56] References Cited

U.S. PATENT DOCUMENTS

| | | | |
|---|---|---|---|
| 3,431,332 | 3/1969 | Cummings | 264/86 |
| 3,449,207 | 6/1969 | Modersohn | 264/86 |
| 3,786,126 | 1/1974 | Reimschussel | 264/87 |
| 3,935,060 | 1/1976 | Blome et al. | 264/86 |
| 4,016,234 | 4/1977 | Warren et al. | 264/86 |
| 4,072,558 | 2/1978 | Akerson | 264/119 |
| 4,252,759 | 2/1981 | Yannas et al. | 264/86 |
| 4,515,848 | 5/1985 | Leunig et al. | 264/DIG. 48 |

FOREIGN PATENT DOCUMENTS 54-34475  3/1979  Japan .......................... 264/DIG. 48

Primary Examiner—Jan Silbaugh
Assistant Examiner—Mary Lynn Fertig
Attorney, Agent, or Firm—Hayes, Davis & Soloway

[57] ABSTRACT

Filter pads, which are made inherently stable by binders and by removal of the binders can be converted in packings to be maintained under substantially constant surface pressure between rigid filter brackets, are produced first as molded bodies from a suspension of filter aids in liquid by depositing granular, fibrous, or fiber-containing filter aids or mixtures of those filter aids in a casting mold, there being used high rates of flow while avoiding turbulences, and adding binders to the suspension so that the molded body can be stabilized by activation of the binder while drying. It is possible in this process also to manufacture multi-layered filter pads, it having been surprisingly found in those multi-layered filter pads that the layer assembly is kept intact during the filtration even in the filter packing that no longer contains binders. The filter pads or the filter packings produced therefrom according to the invention can, when used, and after reflushing and regeneration operations, finally be utilized, after being replaced, as filter aids in the deposit filtration process.

19 Claims, 8 Drawing Figures

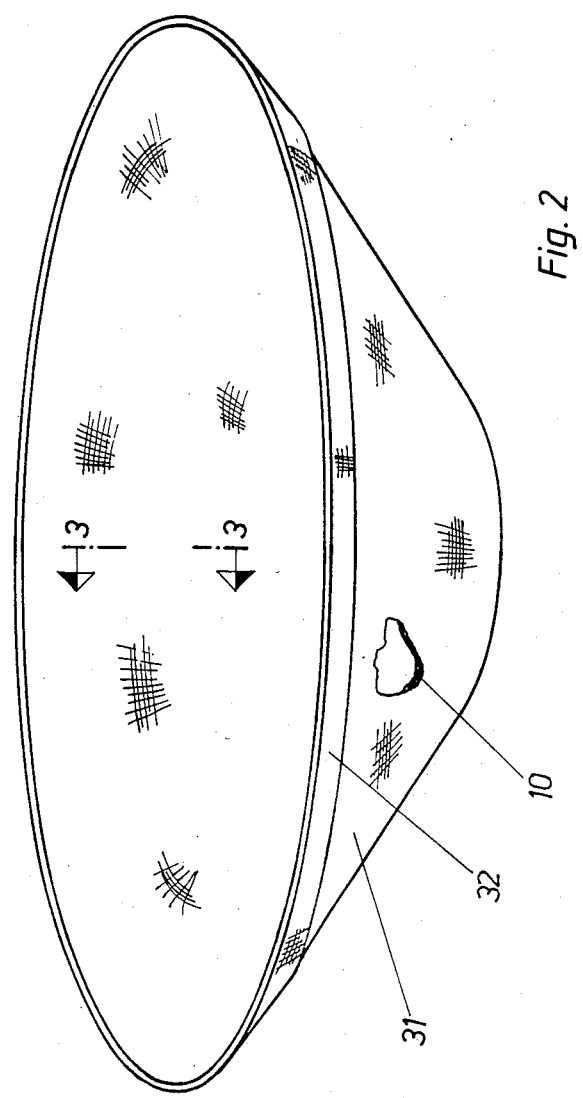

METHOD OF PRODUCING A FILTER PAD

The invention concerns a process for producing a filter pad, which by means of binders is inherently stable and by removal of the binders can be converted to a filter packing held together under substantially constant surface pressure between rigid preferably platelike, filter brackets for filtration and/or physicochemical treatment of liquid and/or gaseous media. The invention further concerns a filter pad produced according to said process and the employment thereof for filtering and physicochemically treating liquid and/or gaseous media.

DE-OS 32 34 560 has disclosed a filtering device specially for beverages wherein filter packings are held between rigid filter brackets under practically constant surface pressure. Said filter packings are inserted, for instance, as frustconical stable filter pads between the filter brackets. As soon as a desired surface pressure that acts upon the filter pad is produced with the filter brackets, the filter pads are converted into granular filter packings by eliminating the binder. But hitherto it has not been possible to predetermine to the desired extent and with the required reproducibility the utility, excellence and qualities of said filter packings. The invention provides, in part an improved manufacturing process for filter pads that can be converted to filter packings in which the filter packings formed from the filter pads thus produced have filtering qualities that can be determined and selected in advance in combination with an increased total throughput capacity and corresponding increased total service life, the same as improved adaptability during the filtration, possibility of adjustment to a desired initial pressure drop and substantially improved insensitivity to pressure and thrust. In another aspect of the present invention the filter pads produced by this novel process are suited to improved methods of use.

Accordingly, the process of the present invention requires:
- producing a suspension from one or more granular, fibrous or fiber-containing filter aids provided for the filter pad and/or one or more mixtures of said filter aids with liquid,
- forming in a casting mold a molded body from said suspension or suspensions in the depositing cycle at predetermined rates of flow on the order of at least 5 hl/m²×h while avoiding turbulences, and
- adding the binder to the filter aid or filter aids and/or the suspension or suspensions, and stabilizing the molded body by activating the binder while drying.

With this novel process of manufacture it is possible to produce an inherently stable filter pad that can be safely transported and easily and safely introduced in a filtering apparatus wherein it can be converted to a highly effective filter packing of the desired properties. The filter packing formed from such filter pads stands out because of a specially high load capacity of the filter surfaces (hl/m²h capacity) and high total throughput capacity together with improved regenerating capacity in closed state and high adaptability during filtration. The manufacturing process according to the invention can be easily and reliably carried out and causes no environmental damage, since all the materials that take part in the process—as long as they are not introduced in the filter pad—can be passed into the cycle.

The binder provided for producing the filter pad can preferably be dissolved and/or dispersed in the liquid of the suspension or suspensions. This is possible because the liquid that remains in the filter pad during the deposit contains sufficient binders to convert the molded body into the filter pad by drying and stabilizing.

Preferred binder materials include: glucose, dextrines, gelatines, certain salts, silicates and the like and/or mixtures of two or more of the foregoing materials.

The filter pad can preferably be formed by forming in a flowable mold a molded body from the suspension or suspensions and converting said molded body in the mold into the filter pad.

In the process according to the invention in addition to the improved filter pads of the type mentioned above composed of a single layer, with the process according to the invention the molded body can be formed by periodically depositing consecutive layers that differ from each other with regard to their filtration properties, while using a suspension that differs with regard to particle size, and/or kind of filtration aid, and/or composition of mixtures of filter aids. With this layer construction it is possible to produce filter pads that have predetermined special properties. At the same time said special properties can be reproducibly controlled by selecting the respective filter aids and/or selecting the process parameters in the manufacture. Such a process parameter is, for instance, the rates of flow used in the deposit operation with the selection of which it is possible to influence to a considerable extent the properties of the filter pad and ultimately the properties of the filter packings formed from the filter pad.

In the process according to the invention it is possible to use in the deposit cycle rates of flow of up to 500 hl/m²h and more, but in any case turbulences in the deposit cycle should be avoided. Preferred rates of flow for the deposit cycle can be between 100 and 300 hl/m²h.

Even though not necessary for the process according to the invention, it is possible to deposit in the mold the layers for the filter pads in a direction opposite to the provided direction of filtration of the filter packing. The consecutively deposited layers can then be gradually composed of coarse filter aids that continuously become finer and at the same time higher rates of flow can be used for forming the coarser layers. In addition, the deposit of the fine layers on the coarser layers offers the advantage that in the depositing process the material of the finer layers penetrates somewhat into the pores on the surface of the coarser layers and thereby a substantially improved surface bond can be obtained between the consecutive layers.

In assembling a filter pad by depositing filter aids in a flowable mold, there is provided in the first place a molded body that must become solidified and stabilized by expelling the liquid. The liquid can be eliminated substantially by drying under elevated temperature. However, a fresh molded body produced by depositing filter aids will still lack the required initial strength to be removed from the mold and introduced in a drier furnace. Accordingly, in a preferred embodiment of the invention the molded body deposited can first be dried in the mold by flowing gaseous medium, preferably heated. This drying by blowing gaseous medium can be carried out as a pre-drying operation until the molded body in the casting mold has the sufficient strength for being removed from the mold and introduced in the drier furnace. But it is also possible to carry out this drying by blowing gaseous medium in a manner such that the molded body is converted into the stable filter pad.

The stabilized dried filter pad can be provided on the outlet side of the filtrate, preferably also on the inlet side of the unfiltered substance, with a layer pervious to liquid and gas, but impervious to particles of filter aid and resistant in respect to the filtrate. Such layers that are impervious to particles of filter aid can be produced, for example, by sealing the outer surface or surfaces of the filter pad with a suitable synthetic material such as a synthetic material having a melamine resine base. Finally, it is also possible in the process according to the invention to provide the inherently stable dried filter pad, at least on its edges, with border for protection against crumbling or damage. It is preferred firmly to sheath the filter pad all around with a porous casing, preferably of tissue, in order to obtain optimal protection on the edges and on the whole surface.

In the process according to the invention, it is possible to produce filter pads of practically any desired kind and with any desired properties. According to the process of the invention, it is possible in particular to produce a filter pad characterized by being provided with a multiplicity of layers of different filtration properties that are made from filter aids of different grain, and/or different textures, and/or different kind, and/or different mixtures, and/or different proportions of ingredients, the adjacent layers having firm mutual surface bond. If such a filter pad according to the invention is converted into a filter packing and used for filtering liquid and/or gaseous media while maintaining a practically constant predetermined surface pressure, it is possible to carry out a multi-step filtration in a single filter packing. Here it has proved surprising that both during the conversion of the inherently stable filter pad into the state of the filter packing and also during the reflushing and regeneration of such filter packings, the local arrangement of filter aids of different grain or other different properties is not lost and can be practically fully maintained. Accordingly, filter pads made in accordance with the invention also can be used in extended treatment processes for liquid and gaseous media such as bleaching treatment, deodorization treatment, enzymatic treatment, fermentation treatment, and others, and also in the combination of such treatments one with the other and in combination of such treatments with fine mesh filtration.

The filter pads and accordingly also the filter packing formed therefrom can have layers formed predominantly or exclusively from granular filter aids. Likewise the filter pad according to the invention and therefore also the filter packing formed therefrom also can have those layers predominantly or exclusively formed from fibrous filter aids of organic or inorganic kind.

The wide range of possible mixtures of filter aids makes it possible to predetermine the construction of a suitable filter pad for each product and for each filtration problem and accordingly to form from said filter pad an optimally suitable filter packing. In a preferred embodiment, the filter pad can be, for instance, assembled in a manner such that—seen in the direction of filtration—the consecutive layers consist of filter aids that from layer to layer filter more finely. With a filter packing formed from such a filter pad, it is possible to achieve a very fine filtration culminating at a reliable disinfecting filtering action, there being guaranteed in addition to the assured filtration result, a relatively great absorption volume of impurities.

The layers of the filter pad can contain filter aids of all kinds such as kieselguhr, (diatomaceous earth), perlite, bentonite, siliceous gel, fuller's earth, activated charcoal, celluloses, linters of cotton, or other suitable fibrous materials, alumimum silicate, polyamide, polyvinylpolypyrrolidone, and other synthetic materials. By incorporating or employing other adsorbing substances or absorbing substances, for instance, it is also possible to obtain bleaching and/or deodorization as accessory or primary effects. The possible uses of the filter pad or of the filter packings to be formed therefrom according to the invention are so extensive that enzymatic and/or fermentative processes can also be carried out thereby.

With a suitably assembled filter pad or filter packing formed therefrom according to the invention, it is also possible to effect all kinds of gas filtration.

The invention covers also the use of a filter pad produced by the process according to the invention for filtration and/or physicochemical treatment of liquid and/or gaseous media. In this connection it is proposed according to the invention that prior to a filtration operation the filter pad be introduced between rigid, for instance, platelike filter brackets, that for converting the filter pad into the filter packing the binder be removed from the filter pad under a predetermined contact pressure on the filter brackets, and that the contact pressure on the filter brackets be maintained during the course of the filtration and of all other process cycles above a minimum, preferably predetermined, value. By the selection of the contact pressure it is possible to adjust an initial value for the pressure drop, the filter packing is already optimally effective at the beginning of the operation. During the course of filtration, it is possible to monitor the pressure drop that sets in in the stream of unfiltered and filtered substances over the filter packing depending on the duration of the filtration, to interrupt the filtration upon increase of the pressure drop above a predetermined value and to wash out by reflushing the filter packing that remains in its layer between the filter brackets, or when the pressure drop increases very quickly or the effectiveness of the flushing operation declines, to interrupt the filtration and regenerate the filter packing using acceptable chemical substances. It is also possible to reflush and regenerate at predetermined intervals of time.

As termination of a filtering operation, the same as termination of a flushing, cleaning or regeneration operation, it is possible with the filter packing formed according to the invention from a filter pad to reduce to a negligible minimum the filtrate or the flushing, cleaning or regenerating agents, by squeezing out the filter packing by accelerating the contact pressure and subsequently blowing with an inert gas. In this manner it is possible to reduce the loss of filtrate to a fraction in comparison with the known filtration process. By the complete removal from the filter packing, it is possible to collect completely the substances used for reflushing, regenerating and sterilizing the filter packing and thus any environmental damage also can be prevented during the process steps.

Finally, when using the filter pad produced according to the invention, the consumed filter packing removed from between the filter brackets can be used in devices for deposit filtration in order to utilize its contents of filter aids as agents for deposit filtration, preferably in prefiltrations.

An embodiment of the invention is explained in detail herein below with reference to the drawing. In the drawing:

FIG. 2 is a filter pad according to the invention shown in perspective;

FIG. 3 shows enlarged diagrammatic partial sections according to line 3—3 of

Figure 4:
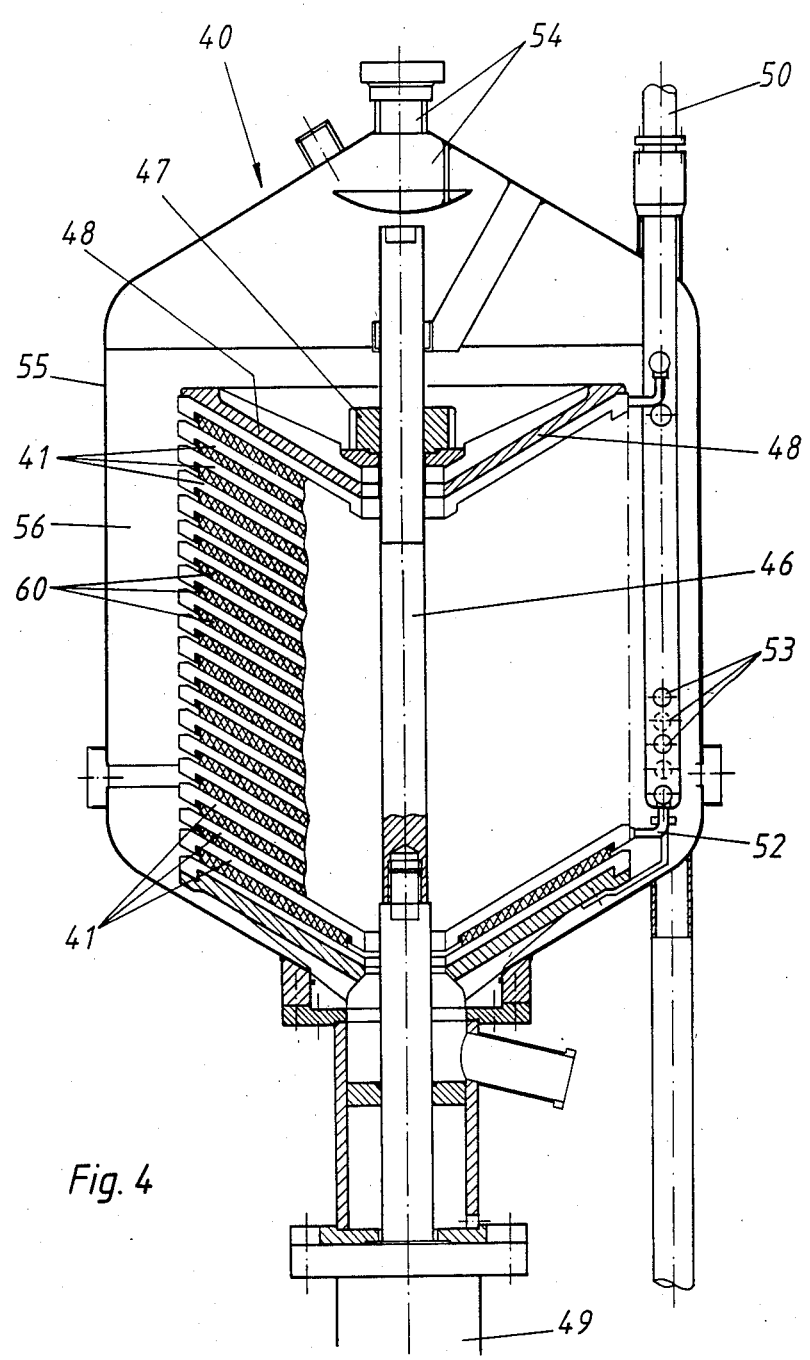
Figure 5:
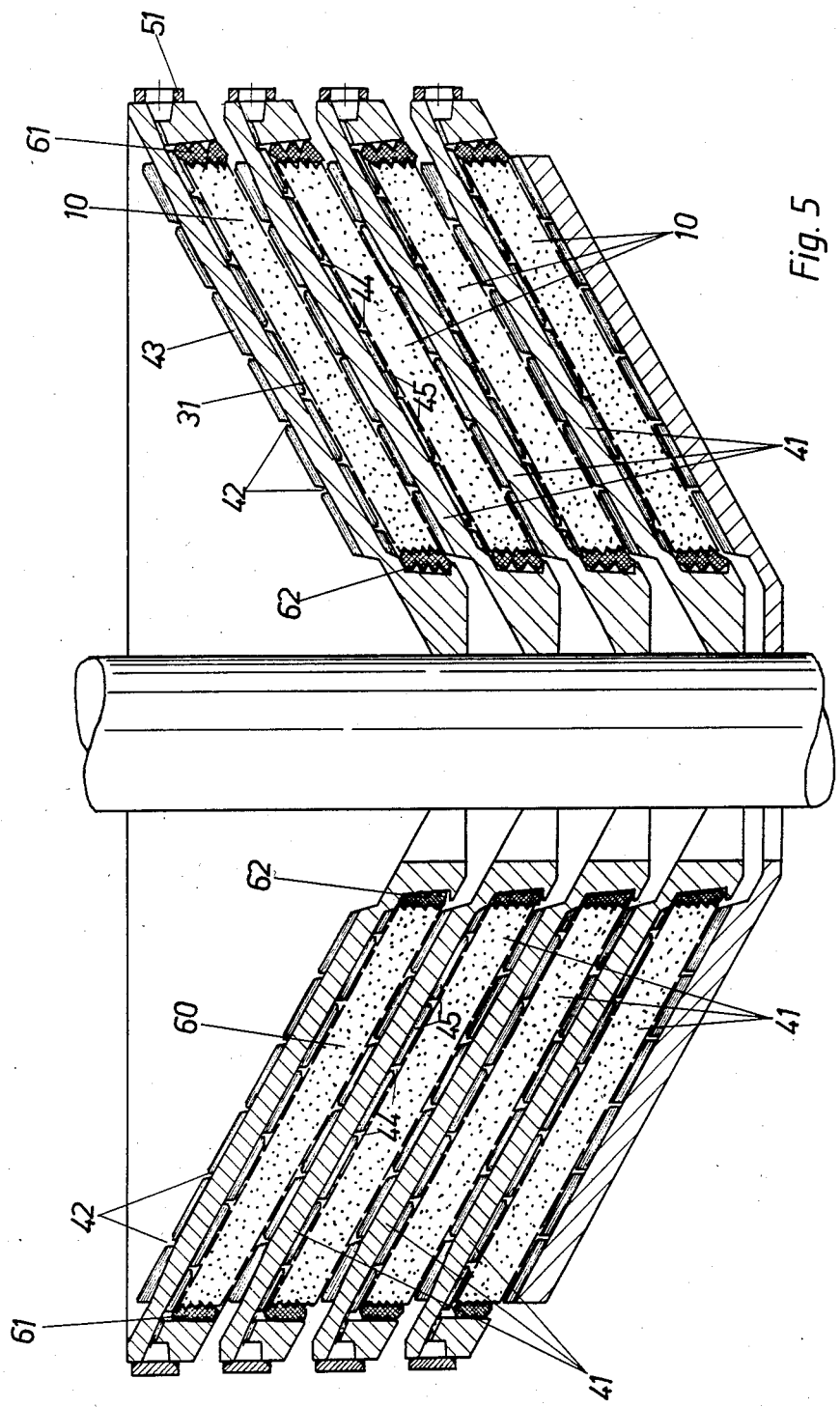
Figure 6:
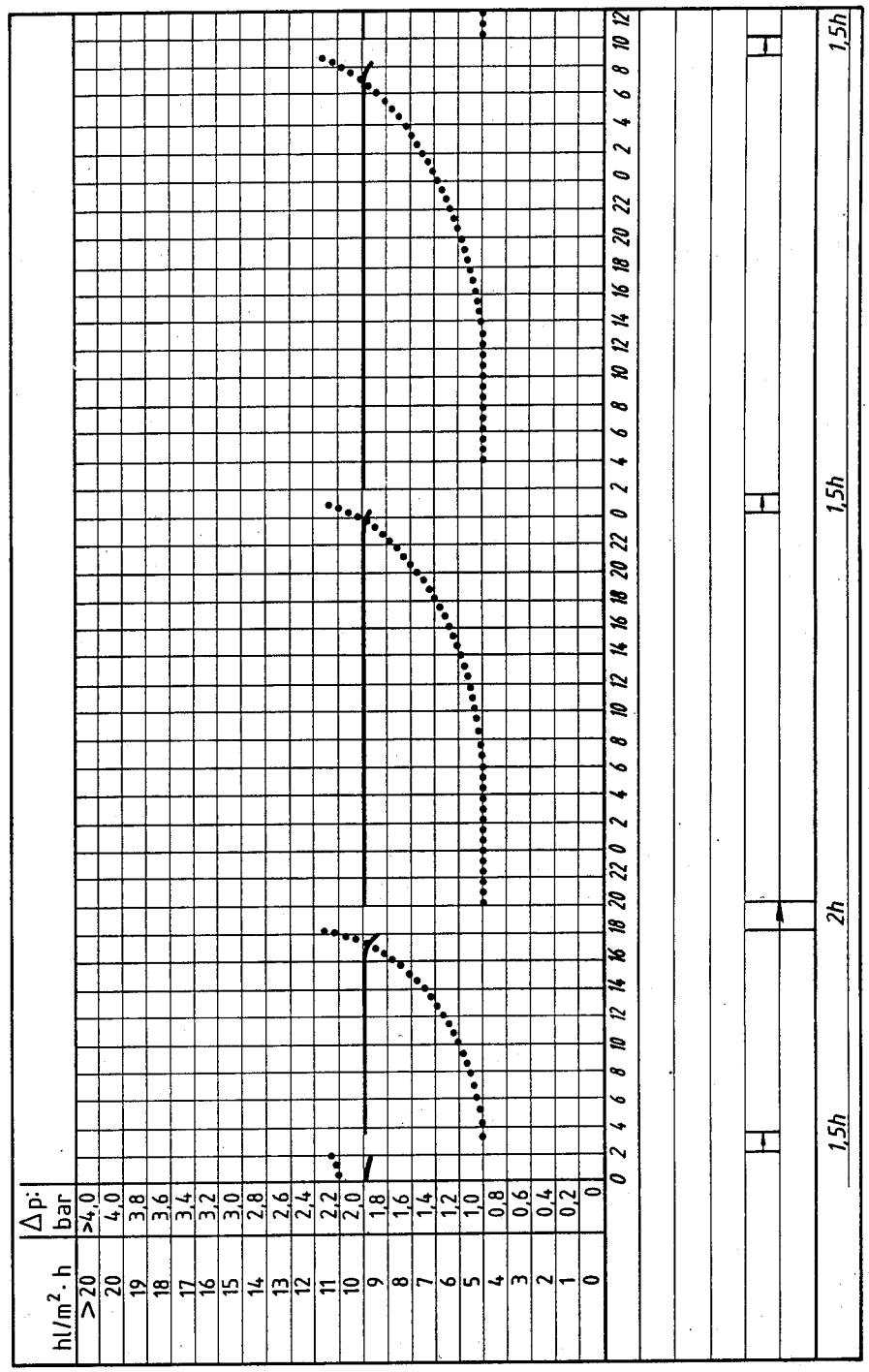

FIG. 2 for a filter pad with:
(a) layers of fibrous filter aids,
(b) layers of granular filter aids, and
(c) layers of mixtures of fibrous and granular filter aids;

FIG. 4 shows in axial section a filter unit with filter packings formed from filter pads according to the invention;

FIG. 5 is a partial illustration of filter brackets and filter packings in a unit according to FIG. 4; and FIG. 6 is a plot of the pressure drop and of the performance in a filter packing formed from a filter pad according to the invention with periodically intervening cleaning and regeneration.

Figure 1:
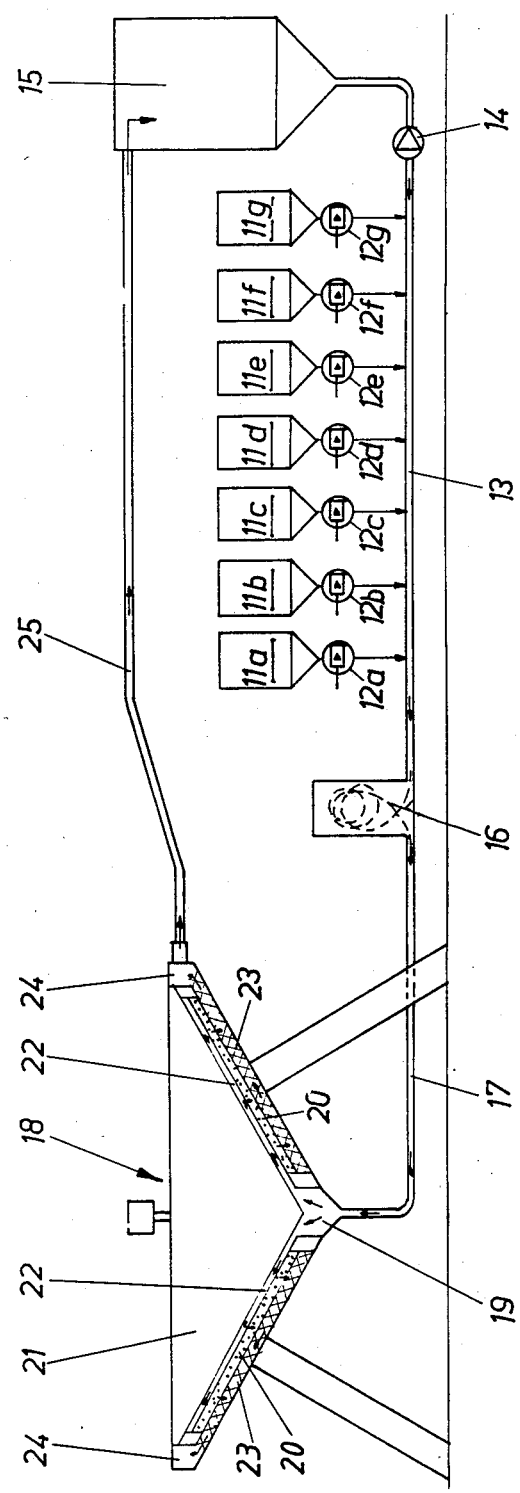
FIG. 1 is a schematic diagram of the process according to the invention.

Referring to FIG. 1, there are provided supplies of material 11a, 11b, 11c . . . 11g for different filter aids or mixtures of filter aids. Each one of said supplies of material 11a, 11b, 11c . . . is connected via a reciprocating pump 12a, 12b, 12c . . . 12g to be actuated under control means (not shown) to a common material-collecting pipe 13 which is connected via a centrifugal pump 14 controllable by its conveying capacity to a tank 15 for suspension liquid. The material-collecting pipe 13 leads to a mixing device such as the mixing cage 16 from which a feed pipe 17 for the suspension formed leads to the casting mold 18. The casting mold 18 is conically built in the example illustrated and has at its tip an inlet space 19 for the suspension. From there a mold cavity 22 in which the molded body 20 is formed extends beneath the casting mold lid 21. The mold cavity 22 is downwardly confined by a deposit plate 23 on the edge of which is situated an annular collector channel. To this annular collector channel 24 is attached a liquid outlet pipe 25 that leads back into the tank 15 for the suspension liquid. The supplies of material 11a, 11b, 11c . . . 11g are likewise constructed like a tank in which different filter aids or mixtures of filter aids are contained. These filter aids previously mixed with suspension liquid can there be deposited dry or preferably in pasty form. The suspension liquid preferably has admixed therein a predetermined amount of binders. When the binder is dissolved in the suspension liquid, a subsequent addition of binder to the suspension liquid is not needed. It is only necessary from time to time to replenish the supply of suspension liquid with binders dissolved therein, since the molded body formed in the casting mold 18 takes along, when removed from the casting mold 18, a certain amount of binders contained in the suspension liquid.

In operation the circulation of the suspension liquid through the casting mold 18 is maintained at the rate of flow desired via rotary pump 14. At the same time, from one or more of the supplies 11a, 11b, 11c, . . . 11g material in the desired amount is introduced in the material-collecting pipe 13, and thus in the suspension liquid passed into the cycle, by actuating the respective reciprocating pump 12a, 12b, 12c . . . 12g. An intensive blending then takes place in the mixing cage 16 so that there is present in the feed pipe 17 a thoroughly blended suspension of filter aids. Said suspension is distributed in the mold cavity 22, the filter aids contained in the suspension being deposited on the deposit plate 23 or a layer of filter aids already formed on the deposit plate 23. The suspension liquid practically free from filter aids then reaches, through the collector annular channel 24, the return pipe 25 and from there the tank 15. If the binder is not dissolved but dispersed in the suspension liquid, it is possible, during the deposit operation that takes place in the casting mold, to obtain also a retension of binders in the deposited layers. In that case, either binders are steadily poured in a predetermined amount in the tank 15 or an additional material supply for binders is connected to the material-collecting pipe 13.

For assembling molded bodies or filter pads having several different layers it is possible in a system according to FIG. 1 to introduce into the material-collecting pipe 13, in consecutive periods of time and from different supplies of material 11a, 11b, 11c . . . 11g by the reciprocating pumps 12, 12, 12c . . . 12g, different filter aids over different periods of time.

When a one-layered or multi-layered molded body 20 has been formed in the above described manner in the mold cavity 22 of the casting mold 18, the lid 21 of the casting mold 18 is lifted and the resulting molded body 20 taken out to be dried and sterilized in a drier furnace under the action of heat. Should it be necessary previously to solidify the molded body 20 to impart to it sufficient structural strength for being taken out from the casting mold 18, this can be done by blowing compressed air which may be pre-heated, if desired. The molded body 20 can be taken out from the casting mold 18 by suitable means that can be provided, for instance, on the mold lid 21, or separately.

In FIGS. 2 and 3 can be seen examples of the assembly of a filter pad 10 according to the invention. This filter pad 10 is made of filter aids and in the example illustrated is frustoconical in shape. The filter pad 10 is circumferentially surrounded by a porous casing 31. Said porous casing 31 in the illustrated example consists of tissue, as it has been hitherto known for use as filter cloth, and has a sealing edge 32 placed outwardly beyond the outer peripheral margin of the filter pad 10, said sealing edge 32 being secured with a burred closure or in any other adequate manner to the part of the casing that is on the external side of the filter pad 10. This porous casing 31 is mounted on the filter pad 10 after stabilizing and drying and eventually surface sealing it.

Figure 3A:
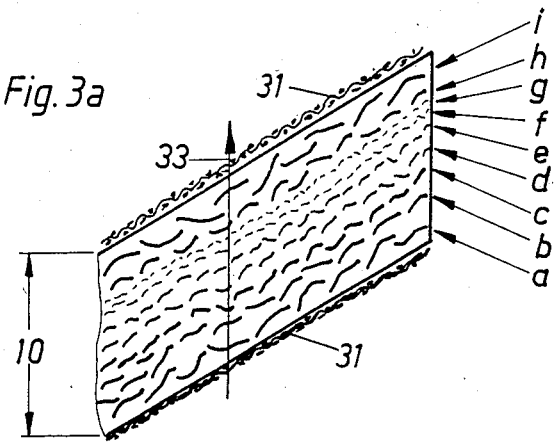
Figure 3B:
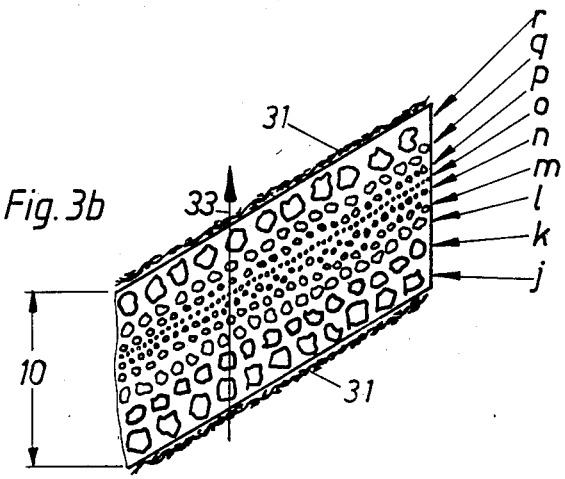
Figure 3C:
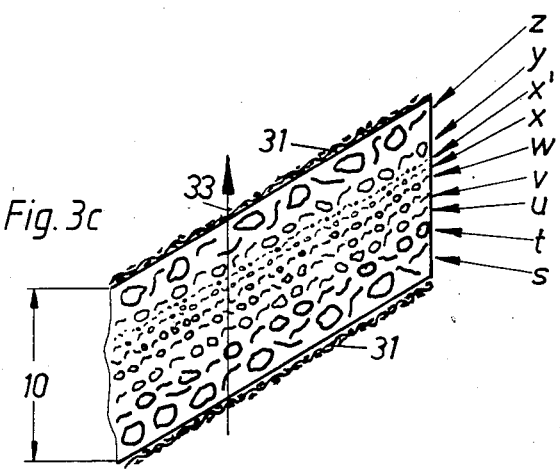

In the examples of FIG. 3 the filter pad 10 has a multiplicity of layers. In the example of FIG. 3a there are provided in the filter pad 10 nine layers a to i made of fibrous filter aids. The layers a to g are—in the direction of filtration flow indicated by the arrow 33—consecutively more finely made starting from a very coarse layer a that substantially acts as distributor for the unfiltered substance, and progressing to a very fine layer g which filters sharply and sterilizes. The very fine layer g is followed—seen in the direction of the filtration flow 33—by a layer h of medium coaseness that can correspond, for instance, to the layer b or c. Said layer h of medium coarseness is followed by a very coarse layer i that acts as collector for the filtrate on the filtrate exit side of the filter packing formed from the filter pad 10. The layer h of medium coarseness substantially acts at the same time as division between the very coarse layer i and the very fine layer g. In the example of FIG. 3b is given an analogous assembly of layers i to r made of granular filter aids. To this assembly logically apply the same viewpoints explained above in connection with the example of FIG. 3a. Unlike the example in FIG. 3a, there follows in the direction of filtration flow 33, after the very fine layer o, a layer p of medium fineness that could correspond, for instance, to the layer m. This layer p of medium fineness is followed—seen in the direction of filtration flow—by a layer o of medium coarseness similar, for instance, to the layer 1 or the layer k. This is then followed—seen in the direction of filtration flow 33—by the very coarse layer r that can correspond, for instance, to the layer j. In the example of FIG. 3c the layers s to z are made of mixtures of granular and fibrous filter aids. For the rest, the same viewpoints explained above in connection with the example of FIG. 3a do apply here. Of course, in the example of FIG. 3c the very fine layer x is also followed - seen in the direction of filtration flow 33—by a quite particularly fine layer x' that can be suitable, for example, for highly effective sterilizing filtration.

The examples shown in FIG. 3 show only basic possibilities. There can be provided, for example, a mixed assembly with layers made of purely granular filter aids and layers made of mixtures of fibrous and granular filter aids such as a layer assembly of—seen in the direction of filtration flow 33—j, k, c, d, w, x, x', y, r, or the like.

As example of the use of a filter pad according to FIGS. 2 and 3, there is reproduced in FIGS. 4 and 5 a filter unit 40 wherein the filter pad 10 is to be introduced together with its casing 31 between rigid filter brackets 41. Said filter brackets 41 are shaped in the illustrated example as conical annular plates that in the superposed sheets form interstices. A filter pad 10 according to FIGS. 2 and 3 fits into each interstice between two adjacent filter brackets 41, the porous casing 31 resting on the surfaces of the adjacent filter brackets 41 and surrounding the peripheral edges of the filter packings formed. The right part of FIG. 5 shows a number of superposed filter brackets 41 with filter pads 10 inserted therebetween. Each filter bracket 41 supports on the upper side a rack 43 for the filter pad 10, which rack 43 is constructed with guide channels 42, and on the underside a rack 45 made with guide channels 54. The stack of filter brackets 41 and filter pads 10 is situated around a central pull rod 46 that carries on its upper portion an energy transmission body 47 that rests on a topmost filter bracket 48. The pull rod 46 is connected at its lower end with a hydraulic cylinder-piston aggregate 49 with which it is possible to exert a controlled traction on the pull rod 46. For connection with a filtrate exit 50, each filter bracket 41 is provided on the outer periphery with one or more connecting pieces 51. These connecting pieces 51 communicate with the channels 44 of the rack 45. Flexible connecting pipes or hoses 52 are led from said connecting pieces 51 to the corresponding terminals 53 on the tubular filtrate exit 50. The inlet for unfiltered substance 54 is centrally mounted on the boiler 55 that accommodates the stack of filter brackets 41 and filter pads 10. At the same time the channels 42 in the rack 43 of each filter bracket 41 communicate with the interior space 56 of the boiler.

After introducing the filter pads 10 between the filter brackets 41 and closing the boiler 55, the activation of the filter pads 10 has to take place prior to the beginning of the filtration. For this purpose the boiler 55 is filled and flushed through with water, preferably hot water or a mixture of wet steam and water. There is simultaneously exerted with the cylinder-piston aggregate 49 a predetermined constant traction on the pull rod 46. During this activation process the binder is released from the filter pad 10. For this purpose it is convenient to press liquid such as hot water through the filter pad 10. This can be optionally done in the direction of the filtration flow or opposite to the direction of the filtration flow. By this activation the filter pads 10 are converted into the filter packing 60 shown on the left part of FIG. 5. A compression of the stack of filter brackets 51 and filter pads 10 can here occur to a certain extent. But in said compression the arrangement and cohesion of the layers a to i, or j to r, or s to z of the filter pad are fully maintained. The filter pad 10 slightly deforms in the free spaces provided in the filter brackets, specially in the area of the sealing rings 61 and 62 to be preferably used, in order to form a reliable sealing between the channels 42 of the rack 43 and the channels 44 of the rack 45. Thereby all the product fed to the filter unit 40 is compelled to penetrate one of the filter packings 60 to reach from the interior space 56 of the boiler 55 the filtrate exit 50. The sealing is permanently ensured by the fact that with the piston-cylinder aggregate 49 a constant pressure is maintained upon the pull rod 56 and thus a constant contact pressure of the filter packing 60 on the filter brackets 41.

As FIG. 6 shows, there sets in during the filtration, under a constant filtering capacity of about 10 hl/m²h, a periodically increasing pressure drop of, for example, 1.0 bar to 2.3 bar on the filter packings 60. This pressure drop the same as the filtering capacity are monitored during the filtration. If upon reaching the maximum pressure drop admissible at the moment of, for example, 2.3 bar, the filtering capacity starts to decline, the filtration is interrupted. The filter packings are then reflushed with flushing liquid and sterilized again while maintaining the contact pressure on the filter brackets 41. The filtration is then resumed, there appearing then again the course of the filtration cycle a pressure drop on the filter packings 60 while the filtration capacity remains constant. After repeated filtration cycles and intervening reflushing, the effectiveness of the reflushing generally declines, which is evidence by the more rapid occurrence of the pressure drop, that is shortening of the filtration cycles between the reflushing operations. The filter packings can then be regenerated. The filter packings 60 remain between the filter brackets 41 also during said regeneration, and the traction on the pull rod 46 and therewith the contact pressure of the filter brackets 41 are also maintained at, or adjusted to, a value suited to the regeneration of the filter packings 60. The regeneration takes place in the manner of a reflush, but not with filtrate but with selected liquid chemical regeneration agents that are suitable to dissolve organic residues (impurities), specially egg whites and polyphenols, from the filter packings 60. By said regeneration agents, there is even effected an intensive cleansing of the porous casing 31 and of the filter aids in the filter packings 60 themselves. This preferably should be followed by a subsequent treatment with an acid solution with which inorganic impurities are also removed.

If it is desired to omit the constant monitoring of the pressure drop on the filter packings 60, it is also possible to effect the reflush and regeneration operations at intervals of time to be predetermined with reference to empirical values.

The reflush and regeneration steps can be extensively improved on the filter packings 60 formed from the filter pads 10 and maintained under constant contact pressure by eliminating at the end of a filtration cycle or flushing cycle, cleansing cycle or regeneration cycle the respective filtrate or flushing, cleansing or regenerating agent leaving only a negligible minimum. For this purpose it is possible to increase the contact pressure on the filter packings 60 to a considerably elevated value without damaging the filter packing even in case of a multilayered filter packing. The filter packings 60 thus considerably compressed yield at the termination of the filtration the major part of the filtrate or rinsing, cleansing or regenerating agents retained. The last residues, except for a negligible minimum, also can be removed by blowing with an inert gas on the filter packing. This method is particularly recommended when specially valuable products are to be filtered, as for instance in the preparation of brandy and the like. In addition, this method is recommended when one or more agents used in reflushing, regenerating, rinsing, acid post-treatment and sterilization have to be collected as completely as possible to avoid environmental damages.

If the filter packing is consumed after repeated regenerations and frequent reflushing, the filter stack formed by the filter brackets 21 and the filter packings 60 is disassembled and equipped with new filter pads 10, which are then activated as described above prior to the filtration and converted to filter packings. Whether the filter packings 60 have been consumed and have to be replaced, is determined either on the basis of the constantly monitored pressure drop or on the basis of empirical values with reference to the duration of the operation or the number of reflushing and regeneration operations. Prior to removing the filter stack from the filter unit 40, one more regeneration operations is effected on the filter packings 60.

The consumed filter packings typically still have, despite the removal of the binder, a solid inner content generally sufficient to permit each filter packing to be taken out intact from its porous casing 31 after drying. The porous casing, after adequate cleansing, may be used to house a new filter pad 10, while the consumed filter packing, which is still held together as a relatively solid body, can be used after sterilization as filter aid in the deposit filtration process, particularly for prefiltration purposes.

The conical shape of the filter pad 10 shown in the example explained above is given only as an example. It is possible adequately to produce filter pads of any desired shape such as square or circular plates of the desired dimensions. It is likewise possible to use the filter pad 10 and the filter packings 60 formed therefrom in filter units other than the one of FIG. 4. Still other changes will be obvious to one skilled in the art. Accordingly, it is intended that all matter contained in the foregoing description or shown in the accompanying drawings shall be interpreted in an illustrative and not in a limiting sense.

I claim:

1. A process for producing a filter pad for filtration or physiochemical treatment of fluids, comprising the steps of:
    (a) preparing several suspensions from fibrous or fiber-containing filter aids and a water soluble binder with liquid;
    (b) forming in a casting mold a molded body from each of said suspensions sequentially by forming said molded body by periodically consecutive deposits of layers that differ from each other by their filtration properties;
    (c) the molded body casting operation being at predetermined rates of flow on the order of at least 5 $hl/m^2h$ while avoiding turbulences;
    (d) stabilizing said molded body by activation of said binder while drying;
    (e) introducing the thus formed filter pad in a filter housing and holding it together under substantially constant surface pressure between rigid, preferably plate-like, filter brackets; and
    (f) removing the binder.

2. A process according to claim 1, comprising using as a binder a material selected from the group consisting of a glucose, a dextrine, a gelatine, a salt, a silicate or mixtures of said materials.

3. A process according to claim 1, comprising effecting the formation of said molded body from said suspensions in the flowable casting mold and effecting in said casting mold the stabilization to form a molded body.

4. A process according to claim 1, wherein said suspensions are different in grain size.

5. A process according to claim 1, wherein said suspensions are different in filtration aid.

6. A process according to claim 1, wherein said suspensions are different in composition.

7. A process according to claim 1, comprising forming said molded body by periodically consecutive deposits of layers said layers differing from each other in filtration properties, while using different rates of flow.

8. A process according to claim 1, comprising effecting the deposit of said layers at rates of flow of up to 500 $hl/m^2h$ and more.

9. A process according to claim 8, wherein said rates of flow are between 100 and 500 $hl/m^2h$.

10. A process according to claim 1, comprising depositing in said casting mold said layers for said molded body in a direction opposite to the provided direction of filtration of said filter packing.

11. A process according to claim 1, comprising drying said deposited molded body in said casting mold by blowing a gaseous medium.

12. A process according to claim 11, wherein said gaseous medium is heated.

13. A process according to claim 1, comprising drying and stabilizing said molded body in a drier furnace at temperatures of up to about 140° C.

14. A process according to claim 1, comprising stabilizing said deposited molded body in said casting mold, by means of blowing a gaseous medium, sufficiently to permit removal of said body from said casting mold, introducing the molded body into a drier furnace, and drying and further stabilizing said molded body in said drier furnace.

15. A process according to claim 1, comprising forming on said stabilized and dried filter pad, on the side of the filtrate outlet, a layer that is pervious to liquid and gas but impervious to filter aid particles and resistant to the filtrate.

16. A process according to claim 15, wherein a layer that is pervious to liquid and gas but impervious to filter aid particles and resistant to the filtrate is also formed on the inlet side of the unfiltered substance.

17. A process according to claim 1, comprising forming on said inherently stable filter pad, at least on its edges, a protection border.

18. A process according to claim 17, comprising firmly wrapping the whole filter pad with a porous casing.

19. A process according to claim 18, wherein said porous casing comprises tissue.

* * * * *